Patented May 1, 1923.

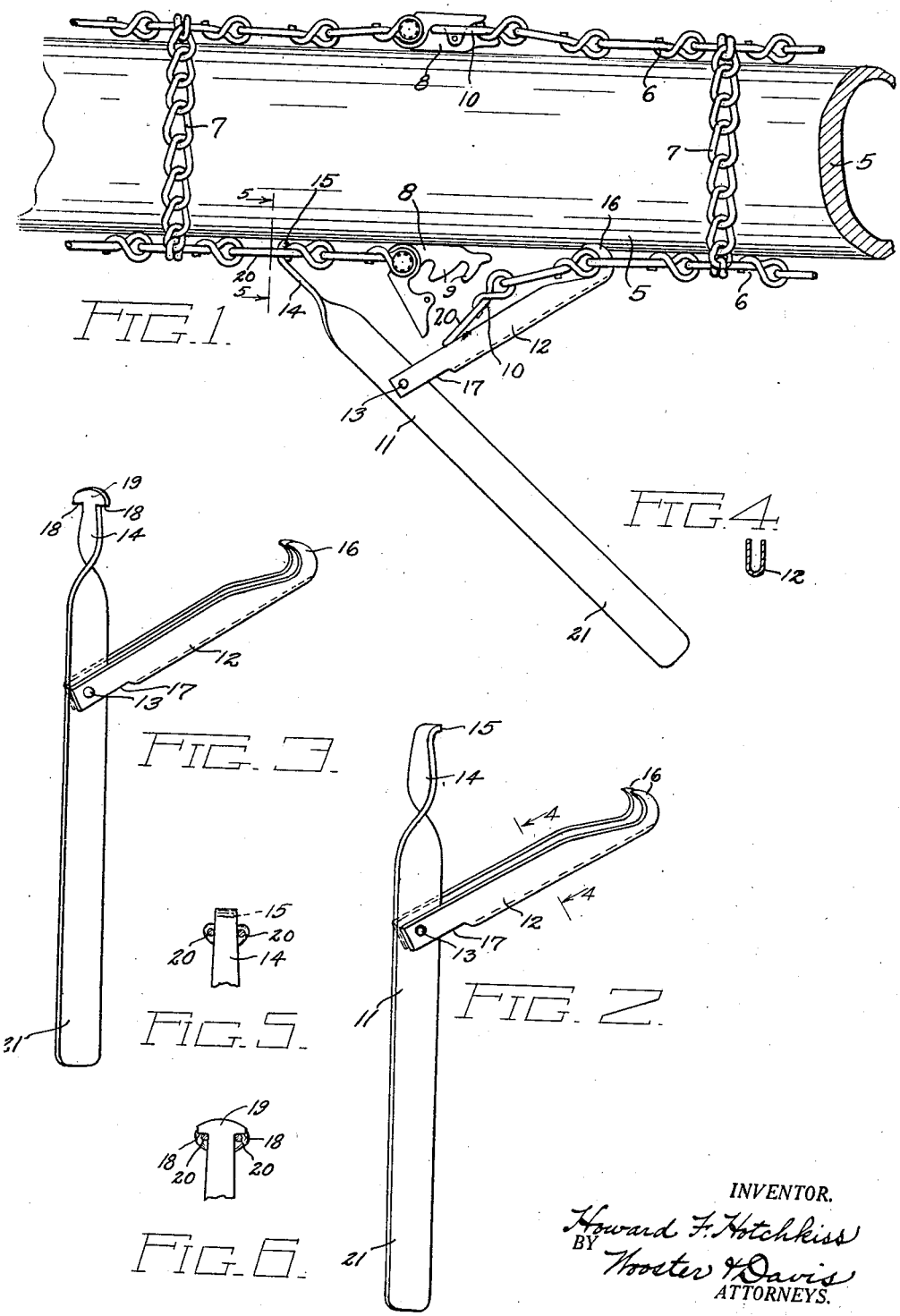

1,453,874

UNITED STATES PATENT OFFICE.

HOWARD F. HOTCHKISS, OF BRIDGEPORT, CONNECTICUT, ASSIGNOR TO THE BRIDGEPORT CHAIN COMPANY, OF BRIDGEPORT, CONNECTICUT, A CORPORATION OF CONNECTICUT.

TOOL FOR ATTACHING AND REMOVING TIRE CHAINS.

Application filed February 20, 1922. Serial No. 537,713.

*To all whom it may concern:*

Be it known that I, HOWARD F. HOTCHKISS, a citizen of the United States, residing at Bridgeport, county of Fairfield, State of Connecticut, have invented an Improvement in Tools for Attaching and Removing Tire Chains, of which the following is a specification.

This invention relates to a tool for attaching and removing antiskid tire chains, and has for an object to provide a simple and efficient device whereby the free ends of the tire chains may be quickly and easily drawn together in applying and removing a chain to or from a tire and holding the same while the ends are connected or disconnected.

It is a further object of the invention to provide a device of this character which will be simple in construction and will occupy little room in a tool kit, which will not be easily gotten out of order, and which will be comparatively cheap to manufacture.

With these and other objects in view, I have devised the device illustrated in the accompanying drawing, in which—

Fig. 1 is an edge view of a section of a tire showing a section of the antiskid chain applied thereto and showing the method of use of my device.

Fig. 2 is perspective view of the preferred form detached.

Fig. 3 is a similar view of a slight modification.

Fig. 4 is a transverse section of one of the members substantially on the line 4—4 of Fig. 2.

Fig. 5 is a transverse section through a link substantially on line 5—5, Fig. 1, and Fig. 6 is a view similar to Fig. 5 showing how the form shown in Fig. 3 engages the link.

Numeral 5 indicates the tire to which is applied an ordinary antiskid chain comprising the side sections 6 and the transverse sections 7 extending over the tread of the tire and connected at their opposite ends to links in the side sections. One of the end links of a side section is connected to any suitable catch 8 provided with hooks 9 adapted to engage with the link 10 on the other end of the side section.

My attaching and removing device comprises two members 11 and 12 pivoted together by any suitable means, such as a rivet 13, intermediate the length of one of said members. Each of said members are formed adjacent one end thereof with means adapted to engage links of the side sections of the chain on opposite sides of the catch 8, and are preferably so proportioned that they may engage the second link from the catch on each side thereof so as to leave the end links free to facilitate manipulation of the catch and its associated link. I preferably form the longer member 11 of a piece of flat metal, as shown, and twist a portion thereof, adjacent one end, through substantially 90° so that it will extend transversely of the remainder of the bar, as shown at 14, and then bend the end thereof to form a hook 15 adapted to engage a link, as shown in Fig. 1. This end of the member is preferably narrower than the remainder of the member so that it will readily enter between the sides of the link. The other member 12 is preferably formed of a flat piece of metal, bent intermediate its width so as to make it substantially U-shaped in cross section, as shown in Fig. 4, with one end of sides thereof shaped to form hooks 16 adapted to engage the link, as indicated in Fig. 1. The curved connecting portion, between the sides or legs, is also cut away for a short distance at its other end, as indicated at 17, so that the two sides or legs may extend on opposite sides of the member 11 and be pivoted thereto by the rivet 13.

In the form shown in Fig. 3, the shorter member 12 is the same as that shown in Figs. 1 and 2 but the link engaging means on the end of the member 11 is formed by providing oppositely extending shoulders 18, adjacent the end thereof, by cutting in or narrowing the transverse portion 14. This connecting means is applied to the link by inserting the head 19 within the link and extending longitudinally thereof and then turning the same through an angle of 90° so that the shoulders 18 engage under the sides 20 of the link, as indicated in Fig. 6.

Although I have shown the member U- shaped in cross section as the shorter member, and as pivoted to the flat member intermediate the length of the latter, the relation may be reversed with the flat member as the short member pivoted at one end between the sides of the U-shaped member and intermediate the length thereof.

The operation is believed to be obvious, the hooks 15 and 16 being inserted in the links as indicated in Fig. 1 and then, by drawing on the handle 21 of the member 11, the ends of the chain are drawn together either for attaching or detaching the end link 10 to or from the catch 8. It will be obvious considerable pull may be applied to the chains through the leverage obtained so that the device may be easily operated. It will also be apparent that the device is very simple and yet rigid in construction.

Having thus set forth the nature of my invention, what I claim is:

As a new article of manufacture, a device for use in applying and removing anti-skid chains comprising a flat strap member with a portion at one end twisted so that it will extend transversely to the remaining portion and provided with means for engaging a chain link, and a second member pivoted to the first member and substantially U-shaped in cross section with the portion between the legs removed at the opposite ends thereof, said legs being adapted at one end to straddle the first member at said pivot and at the other end curved to form hooks to engage another chain link.

In testimony whereof I affix my signature.

HOWARD F. HOTCHKISS.